US008277726B2

(12) United States Patent
Kung et al.

(10) Patent No.: US 8,277,726 B2
(45) Date of Patent: Oct. 2, 2012

(54) HYBRID WATER TREATMENT FOR HIGH TEMPERATURE STEAM GENERATORS

(75) Inventors: Steven C. Kung, North Canton, OH (US); Dennis K. McDonald, Massillon, OH (US)

(73) Assignee: Babcock & Wilcox Power Generation Group, Inc.

( * ) Notice: Subject to any disclaimer, the term of this patent is extended or adjusted under 35 U.S.C. 154(b) by 123 days.

(21) Appl. No.: 12/725,777

(22) Filed: Mar. 17, 2010

(65) Prior Publication Data
US 2011/0229371 A1  Sep. 22, 2011

(51) Int. Cl.
*A61L 9/00* (2006.01)
*A61L 2/08* (2006.01)
*C23F 11/04* (2006.01)
*C23F 11/06* (2006.01)
*C02F 1/70* (2006.01)
*B08B 3/00* (2006.01)
*F01N 3/02* (2006.01)

(52) U.S. Cl. .................. 422/11; 422/4; 422/26; 422/27; 422/13; 422/14; 422/306; 422/307; 165/DIG. 513; 122/459; 210/757; 134/30; 134/102.1; 60/318; 60/775; 60/39.26; 60/39.3; 60/39.49

(58) Field of Classification Search .......... 422/4, 26–27, 422/11, 13–14, 306–307; 165/DIG. 513; 122/459; 210/757, 750, 748; 252/178, 390; 134/30, 102.1; 60/318, 775, 39.26, 39.3, 39.49, 39.53
See application file for complete search history.

(56) References Cited

U.S. PATENT DOCUMENTS
4,054,174 A  10/1977  Haller
7,635,449 B2 * 12/2009  Bailey et al. .................... 422/11

OTHER PUBLICATIONS
New Zealand Examination Report dated Mar. 22, 2011 for NZ Patent Application No. 591737.
The Babcock & Wilcox Company, Steam/its generation and use, 41st ed., Ch. 1, "Steam Generation—an Overview" and Ch. 42, Water and Steam Chemistry, Deposits and Corrosion, 2005, U.S.A.

* cited by examiner

*Primary Examiner* — Jill Warden
*Assistant Examiner* — Monzer Chorbaji
(74) *Attorney, Agent, or Firm* — Eric Marich

(57) ABSTRACT

A steam generation system comprises: an oxygenated water treatment (OWT) sub-system configured to generate water having oxidizing chemistry; a steam generation sub-system configured to convert the water having oxidizing chemistry into steam having oxidizing chemistry; an attemperator or other injection device or devices configured to add an oxygen scavenger to the steam having oxidizing chemistry to generate steam having less oxidizing or reducing chemistry; and a condenser configured to condense the steam having less oxidizing or reducing chemistry into condensed water.

26 Claims, 2 Drawing Sheets

HYBRID WATER TREATMENT FOR HIGH TEMPERATURE STEAM GENERATORS

BACKGROUND

In the steam generator arts, one consideration is corrosion of steel piping or other steel components that come into contact with steam. Corrosion problems are enhanced at higher steam temperatures. A known approach for reducing corrosion is the oxygen water treatment (OWT). See, e.g. *Steam: Its Generation and Use*, 41st edition, edited by J. B. Kitto and S. C. Stultz (The Babcock & Wilcox Company, Barberton, Ohio, USA© 2005), the text of which is hereby incorporated by reference as though fully set forth herein in its entirety.

A problem with the OWT process manifests at higher temperatures, which increases oxide growth on the inner surfaces of the superheater and reheater pendants from steam oxidation. When the oxide becomes sufficiently thick, the outer layer of the oxide tends to exfoliate in large flakes from the tube inner diameter (ID) surfaces during cooling. OWT reduces the critical thickness for oxide exfoliation. The exfoliant can accumulate in the tube bends and plug the steam flow path during the following boiler restart. The pluggage reduces the cooling effect from steam and can lead to overheating tube failures.

Current methods of managing the problem of oxide exfoliation in steam generators that employ OWT include: (1) upgrading the superheater and reheater pendants to more oxidation-resistant alloys; (2) more frequent shutdowns of the boilers, followed by steam blows to clear the exfoliant from the tube loops before restart; (3) using X-ray and/or a magnet to determine the amount of pluggage in the tube bends, followed by cutting substantially blocked tube loops to clear the exfoliant; and (4) processing the tube ID to increase the oxidation resistance of the tube surface. Two or more of these four solutions are sometimes employed together to deal with the oxide exfoliation problem. Implementation of any of these four methods is expensive and time consuming. Methods (2) and (3) are focused on physical removal of the oxide exfoliant accumulated in the tube loops, while methods (1) and (4) upgrade tube surface chemistry to combat excessive oxidation.

BRIEF SUMMARY

In one aspect of the disclosure, a disclosed method comprises: performing steam generation including a water phase and a steam phase using a steam generator including steel tubing; applying an oxygenated water treatment in the water phase to convert the water to an oxidizing chemistry; and applying a reducing water treatment in the steam phase that converts the steam to a lower oxidation chemistry or to a reducing chemistry.

In another aspect of the disclosure, a disclosed apparatus comprises: a steam generator including steam-side steel tubing arranged to carry generated steam; and an attemperator or other injection device configured to inject into the steam-side steel tubing at least one of water and steam further including an oxygen scavenger additive.

In another aspect of the disclosure, a disclosed steam generation method comprises: oxygenating water to generate water with oxidizing chemistry; converting the water with oxidizing chemistry into steam with oxidizing chemistry; and, after the converting, adding an oxygen scavenger to the steam with oxidizing chemistry to create steam with less oxidizing or reducing chemistry.

In another aspect of the disclosure, a disclosed steam generation system comprises: an oxygenated water treatment (OWT) sub-system configured to generate water having oxidizing chemistry; a steam generation sub-system configured to convert the water having oxidizing chemistry into steam having oxidizing chemistry; an injector configured to add an oxygen scavenger to the steam having oxidizing chemistry to generate steam having less oxidizing or reducing chemistry; and a condenser configured to condense the steam having less oxidizing or reducing chemistry into condensed water.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
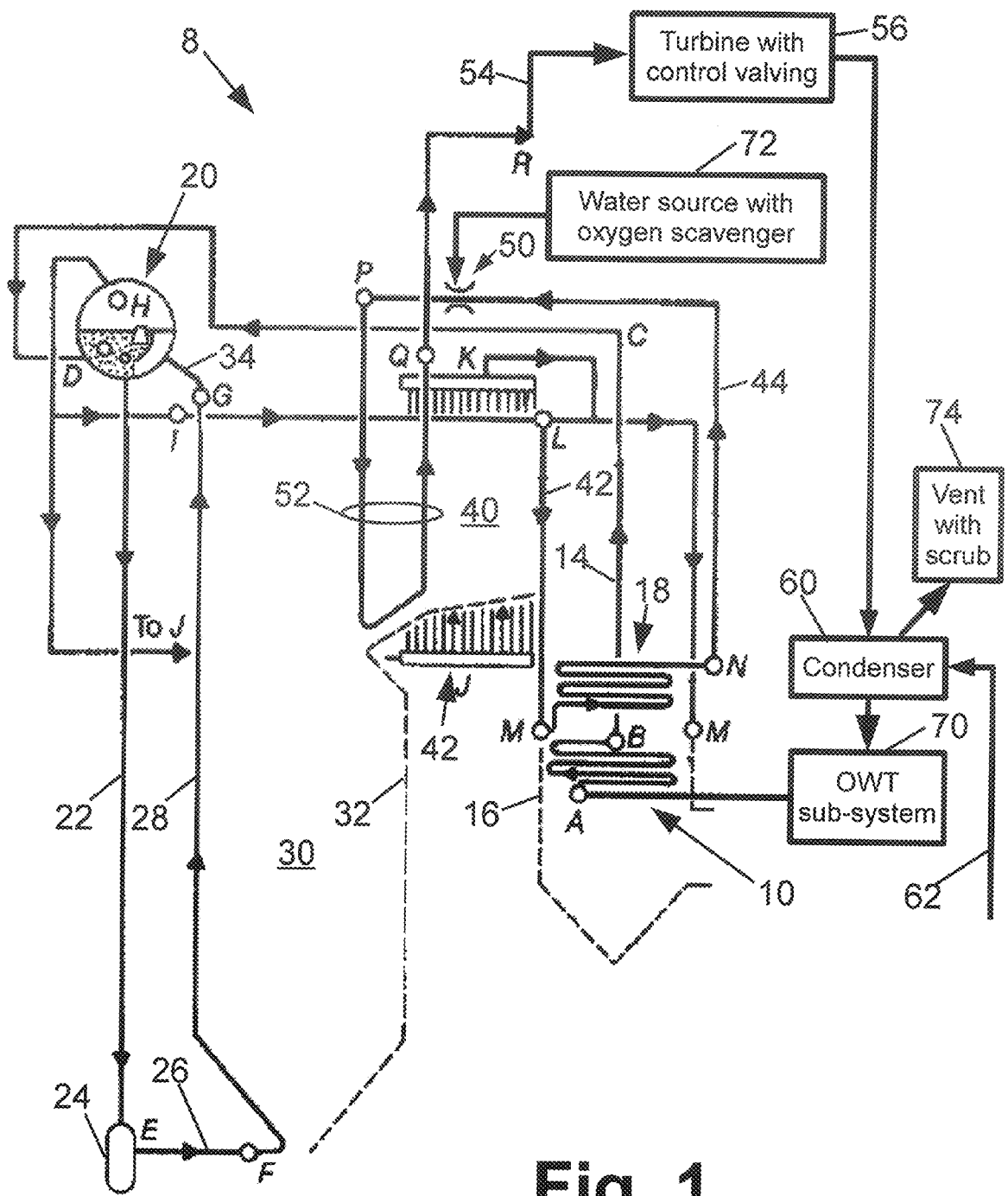
FIG. 1 diagrammatically shows an illustrative steam generator water/steam circulation system employing water treatment as disclosed herein.

With reference to FIG. 1, an illustrative water/steam circulation system 8 for a natural circulation drum-type steam generator is shown. In the circulation system 8, feedwater enters the inlet header A of an economizer 10 and passes upward in an opposite direction to downward flow of flue gas. The water is collected in a header B, which is optionally also located in the flue gas stream. The water then flows through tubing or piping that connects the header B of the economizer 10 to a steam drum 20. In the illustrative configuration, vertical tubing 14 runs vertically from the header B through a convection pass 16 (indicated diagrammatically in FIG. 1 by a dashed line indicating a left-hand wall and lower portion of the convection pass 16) to one or more economizer outlet headers C located at the top of the steam generator. In this configuration, the vertical tubes 14 between the headers B and C can suitably serve as water-cooled supports for additional elements such as an illustrated horizontal primary superheater 18 and/or a reheater (not illustrated). The water from the outlet headers C is conveyed into the steam drum 20 at an inlet D. The fluid circuit along the path containing points A, B, C, D suitably carries water.

At the steam drum 20, the water mixes with water discharged from steam-water separators before entering a downcomer pipe 22 at a downcomer pipe inlet which exits from the steam drum 20. An outlet E of the downcomer pipe 22 comprises a distribution manifold 24 that distributes the water into supply tubes or pipes 26 that convey water into inlets F of tubing, such as a water wall, or another fluid conduit or conduits 28 disposed in or around a furnace 30. Note that in diagrammatic FIG. 1, the left side of the furnace 30 is drawn to diagrammatically show the fluid conduit or conduits 28, while the right side of the furnace 30 diagrammatically drawn using a dashed line 32. In practice, the fluid conduit or conduits 28 are typically disposed completely around or otherwise substantially encompassing the perimeter of the furnace 30. Additionally or alternatively, a portion or all of the fluid conduit or conduits 28 are contemplated to pass generally upward around the furnace 30. For example, in one alternative the fluid conduit or conduits 28 include spiral-wound tubes extending upwardly around the furnace 30.

The furnace 30 employs a suitable heat source, such as coal combustion in the case of a coal-fired steam generator, natural gas in the case of a gas-fired steam generator, or fuel oil in the case of an oil-fired steam generator. More generally, the furnace 30 may be heated by combustion of any combustible material capable of generating heat to increase the enthalpy of the fluid in the fluid conduit or conduits 28.

To reiterate, the water flows down through the downcomer pipes 22 to the distribution manifold 24 at the bottom of the furnace 30, where the manifold 24 and supply tubes 26 route and distribute the circulating water to lower furnace panel wall headers or other inlets F of the fluid conduit or conduits 28. The water rises through the furnace walls through the fluid conduit or conduits 28 where, in a subcritical pressure drum-type boiler or steam generator, the water is converted into a two-phase (water/steam) mixture, which exits at outlet headers G of the fluid conduit or conduits 28. The two-phase water/steam mixture is conveyed from the outlet headers G through riser tubes 34 and is discharged into the steam drum 20 where the steam-water separators operate to separate the steam and water components of the two-phase mixture. This separation returns substantially steam-free water to the downcomer inlet connections D.

The residual moisture in the steam that leaves the primary steam separation devices of the steam drum 20 is removed in secondary steam separators (details not illustrated), and dry steam is discharged to the superheater 18 through a plurality of drum outlet connections H, which in FIG. 1 include illustrative connections to illustrative headers I and illustrative headers J. The steam circuitry downstream of the outlet connection H of the steam drum 20 cools the convection pass enclosure 16, and generates superheated steam conditions. Steam from the outlets H of the steam drum 20 passes through multiple connections to the headers I supplying the roof tubes and, separately, to the headers J supplying membrane panels of a pendant convection pass 40 (so named because the superheater/reheater vertical tubes are hanging from supports above). The steam flows through these membrane panels to outlet headers K. Steam from these outlet headers K and the roof tube outlet headers L then provides the cooling for the convection pass enclosure 16 (which is sometimes referred to as the horizontal convection pass 16 because the tubes of the superheater 18, economizer 10, and reheater (not shown) are horizontal in this flue gas downpass). Steam flows downward through tubes 42 providing the cooling for the convection pass enclosure 16, and is collected in outlet headers M just upstream (with respect to a direction of flue gas flow) of the economizer bank 10.

Steam flow then enters and rises upward through the primary superheater 18 and discharges through an outlet header N and connecting piping 44 which carries superheated steam. A spray attemperator 50 is included in the piping 44. An attemperator is a device that controllably cools the superheated steam by adding water or lower temperature steam into the superheated steam flow. The superheated steam, after controlled temperature reduction via the attemperator 50, then enters an inlet header P feeding into a secondary superheater schematically indicated at 52. The superheated steam flows through the secondary superheater section 52 to an outlet header Q. Although one attemperator 50 and one secondary superheater section 52 is illustrated in FIG. 1, optionally two or more secondary superheating sections are provided, and optionally two or more attemperators are provided, for example with an attemperator between each superheating section, in order to provide superheated steam at a desired elevated, and controlled, temperature. The final outlet header Q delivers the superheated steam to a discharge outlet R. The superheated steam delivered at the discharge outlet R feeds into one or more steam lines 54 that pass outside of the boiler or steam generator enclosure (not shown) to connect with a suitable load, such as an illustrated turbine with control valving 56 such as may be suitably used in the case of a steam generator for use in generating electrical power.

Downstream from the load, the steam returns to the steam generator. A condenser 60 removes any remaining excess heat so as to condense the steam back into water that forms the feedwater entering into the bottom header A, thus completing the closed circulation loop of the water/steam circulation system 8. A make-up water supply 62 is provided to compensate for any lost fluid. In alternative embodiments, the steam generator operates in a completely open fluid cycle in which the output of the condenser 60 is not fed back into the steam generator and instead the feedwater is provided in its entirety by an external water supply.

The water/steam circulation system 8 of FIG. 1 is a simplified illustrative example. The illustrated water/steam circulation system 8 is a natural circulation, subcritical steam generator which includes superheaters 18, 52; however, the disclosed water treatment techniques are also applicable to once-through, supercritical pressure steam generator systems. The illustrated system 8 employs natural circulation, but assisted circulation or forced circulation steam generator systems via suitable pumping is also contemplated. The steam generator of FIG. 1 is merely an illustrative example, and can be replaced by another type of steam generator. The heat source for steam generation can be diverse, for example via combustion of coal, gas, oil or other combustible fuels. Numerous additional or other components may be added as appropriate for specific applications, and/or described components can be arranged in different configurations. For example, while the steam generator illustrated in FIG. 1 does not include a reheater, the concepts of the present disclosure also apply to steam generators including one or more stages of reheaters. In such applications, spray attemperator(s) would typically be provided at the inlet(s) of such reheaters to provide reheat steam temperature control. The various steam generators and steam generation systems that can utilize the disclosed water treatment techniques are described, for example, in *Steam: Its Generation and Use,* $41^{st}$ edition, edited by J. B. Kitto and S. C. Stultz (The Babcock & Wilcox Company, Barberton, Ohio, USA© 2005), the text of which is hereby incorporated by reference as though fully set forth herein in its entirety.

The water/steam circulation system 8 of FIG. 1 further includes an oxygenated water treatment (OWT) sub-system 70. This sub-system provides protection from corrosion of the steel tubing or other steel that comes into contact with the water or steam. The OWT process is based on the observation that, in the absence of impurities, oxygen can form a protective iron oxide that is less soluble than that formed under oxygen-free conditions. The OWT sub-system 70 establishes a controlled concentration of oxygen in the feedwater. For effective formation of the protective iron oxide, the feedwater should be of high purity. For example, in some embodiments the feedwater undergoing the OWT treatment has a cation conductivity of less than 0.15 µS/cm at 25 C. The OWT sub-system 70 adds a low concentration of oxygen to the feedwater. In some embodiments, the target oxygen concentration is in a range of about 0.040 ppm and 0.150 ppm, although higher or lower oxygen concentrations are also contemplated. The feedwater pH can be reduced as compared with similar boilers operating without OWT. For further description of the OWT process, see, e.g. *Steam: Its Generation and Use*, 41$^{st}$ edition, edited by J. B. Kitto and S. C. Stultz (The Babcock & Wilcox Company, Barberton, Ohio, USA© 2005), the text of which is hereby incorporated by reference as though fully set forth herein in its entirety.

Without being limited to any particular theory of operation, it is believed that: (i) the OWT provided by the OWT sub-system 70 increases compression stresses in the oxide formed on ID surfaces of the superheater elements 18, 52, any reheater, or so forth during cooling; and (ii) these increased compression stresses tend to cause the outer oxide layer to exfoliate more easily in larger flakes. These flakes are prone to plug the tube bends and cause overheating failures during a subsequent boiler restart. The additional stresses are believed to be generated by formation of a hematite phase on the magnetite layer (often referred to as the outer layer of the surface oxide) and spinel layer (often referred to as the inner layer of the surface oxide). The hematite has a low thermal expansion coefficient compared to the underlying oxide as well as the steel substrate. Therefore, during cooling it creates large compression stresses in the oxide on the steel and forces the outer oxide layer (including the hematite) to exfoliate from the inner oxide layer as larger flakes. In steam generators that operate at higher temperatures, the higher steam temperatures increase oxide growth on the inner surfaces of the superheater and reheater pendants from steam oxidation, and increase the overall heating/cooling temperature swings, thus leading to faster exfoliation in larger average flake sizes. The critical thickness of the oxide for exfoliation from OWT has been found to be significantly thinner than that from some other corrosion-resistance treatment processes such as all-volatile treatment (AVT). As a result, in existing steam generators that employ OWT the benefits of reduced corrosion in the feedwater piping and deposition in the furnace wall tubing obtained by the OWT come at the expense of increased oxide exfoliation and pluggage problems in the high temperature superheater and reheater tube sections caused by the OWT.

As disclosed herein, to reduce or eliminate this disadvantage of increased oxide exfoliation and pluggage problems caused by the OWT, it is disclosed herein to employ an additional water treatment process in the steam phase. The disclosed approach applies OWT to the feedwater (or, more generally, in the water phase) via the OWT sub-system 70 to provide water with an oxidizing chemistry. The water with an oxidizing chemistry is converted to steam (and optionally superheated steam) also having an oxidizing chemistry. However, at some point in the steam phase an oxygen scavenger, such as hydrazine and/or carbohydrazide, is introduced to the steam circuits. The oxygen scavenger scavenges the oxygen present in the steam due to the OWT processing, in order to produce steam with a less oxidizing or reducing chemistry.

With continuing reference to FIG. 1, in a suitable embodiment the oxygen scavenger is introduced via one or more attemperators. In the illustrative embodiment, the spray attemperator 50 performs attemperation using a source 72 providing water or steam that includes the oxygen scavenger. The spray attemperator 50 thus introduces the oxygen scavenger into the steam prior to the steam entering the inlet header P feeding into the secondary superheater 52. In more complex steam circuits that include multiple superheating elements and/or reheating elements with multiple attemperators, one, two, or more of the attemperators can be modified to deliver attemperation water or steam including an oxygen scavenger additive.

Advantageously, the attemperator 50 is an existing system component configured to inject water into the steam circuit. Thus, the modification to introduce the oxygen scavenger entails only adjustment of the attemperation water that feeds into the attemperator 50. However, it is also contemplated to additionally or alternatively introduce the oxygen scavenger into the steam circuit via another injection device or devices, which optionally may include a dedicated injection device provided for the sole purpose of introducing the oxygen scavenger.

Addition of the oxygen scavenger produces steam downstream from the oxygen scavenger injection point that has a less oxidizing, or even reducing, chemistry. Without being limited to any particular theory of operation, it is believed that the less oxidizing or reducing steam condition suppresses formation of a hematite phase on the oxide surface and thus reduces the stress buildup from boiler cycling and shutdown. Lowering these residual stresses in the oxide suppresses the tendency for the outer oxide layer to exfoliate during cooling, thus reducing or eliminating exfoliation-related pluggage. This less oxidizing or reducing chemistry is present at all points downstream in the steam circuit from the injection point of the oxygen scavenger. Thus, in the illustrative example, steam flowing through the secondary superheater 52 has the less oxidizing or reducing chemistry, and hence is unlikely to cause excessive oxide exfoliation and flaking, which is also advantageous for the downstream (with respect to the direction of steam flow) turbine 56 and reheater (not shown).

The oxygen scavenger can be substantially any additive that scavenges oxygen from the steam and is compatible with the high temperature steam environment into which the oxygen scavenger is injected. In some embodiments the oxygen scavenger comprises hydrazine. In some embodiments the oxygen scavenger comprises carbohydrazide. In some embodiments the oxygen scavenger comprises a hydrazine-based oxygen scavenger. In some embodiments the oxygen scavenger comprises a hydrazide-based oxygen scavenger. Various combinations of hydrazine and/or another hydrazine-based oxygen scavenger and/or carbohydrazide and/or another hydrazide-based oxygen scavenger are also contemplated. The concentration of the oxygen scavenger additive should be sufficient to provide the desired less oxidizing or reducing chemistry. For example, if after OWT the water (and hence also the converted steam) has oxygen concentration of about 0.100 ppm, then the oxygen scavenger additive should be sufficient to scavenge substantially all of this oxygen, e.g. should have a concentration of about 0.100(x) ppm, where x is a multiplicative factor to accommodate incomplete scavenging by the additive oxygen scavenger. In some specific cases, x=1 may be appropriate.

The steam having the less oxidizing or reducing chemistry flows through the steam circuit downstream of the injection point (that is, downsteam of the spray attemperator 50 in the illustrative embodiment) and is eventually collected in the condenser as water. In some embodiments, the oxygen scavenger is more volatile than water and remains in the gas phase during condensation. This is the case, for example, for hydrazine or carbohydrazide. Hence, the more volatile oxygen scavenger remains in the gas phase during condensation and is vented from the system via a vent 74 having suitable scrubbing capability for safely containing or processing the gas-phase oxygen scavenger. In some embodiments, a scrubber based on activated charcoal is suitably used to contain the gas-phase oxygen scavenger. The condensed water is then substantially free of the oxygen scavenger, and is input to the OWT sub-system 70 where it again undergoes OWT as already described to complete the cycling.

If the oxygen scavenger partially or wholly condenses with the water at the condenser 60, then suitable liquid-phase filtering or processing is employed to remove the liquid-phase oxygen scavenger from the condensed water prior to inputting to the OWT sub-system 70.

In embodiments in which the condensed water is not fed back into the steam generator, substantially any suitable safe disposal process can be employed to contain or render harmless the gas-phase and/or liquid-phase oxygen scavenger.

The portion of the disclosed water treatment entailing addition of an oxygen scavenger has some similarities to traditional all volatile treatment (AVT). See, e.g. *Steam: Its Generation and Use*, 41$^{st}$ edition, edited by J. B. Kitto and S. C. Stultz (The Babcock & Wilcox Company, Barberton, Ohio, USA© 2005), chapter 42, the text of which is hereby incorporated by reference as though fully set forth herein in its entirety. In AVT, no oxygen is added to the feedwater and to the contrary an oxygen scavenger is added to the feedwater to scavenge any residual oxygen that may be present. A goal of AVT is to eliminate oxygen throughout both the water and steam circuits. As compared with OWT, in the AVT the hematite phase on the surface of the magnetite is substantially less, or even absent, and this results in a slower buildup of residual stresses in the oxide during cooling. The slower stress buildup permits the outer oxide layer to grow substantially thicker before onset of exfoliation, as compared with OWT. In addition, a slower stress buildup reduces the amount of oxide exfoliation that occurs during each cooling event, thus producing smaller flakes that have less tendency to plug the tubing. Consequently, steam generators employing the AVT water treatment typically experience substantially reduced pluggage in the superheater and reheater tubing due to oxide exfoliation as compared with OWT. On the other hand, the AVT is substantially less effective at suppressing corrosion in the feedwater piping and deposition in the furnace wall tubing 28 as compared with OWT.

The water treatment disclosed herein employs OWT performed in the water circuit. This provides the substantial benefits of OWT in terms of suppressing corrosion and deposition in the water circuit and in the lower temperature portion of the steam circuit. An oxygen scavenger is added later, in the steam phase, in the illustrative example via the spray attemperator 50 or other injection device or devices disposed in the steam circuit upstream of the high temperature portion 52 of the steam circuit. The added oxygen scavenger is at a concentration sufficient to largely or completely scavenge the oxygen added by the OWT. For example, if the oxygen concentration due to the OWT is in a range of about 0.040 ppm and 0.150 ppm, then the concentration of oxygen scavenger injected into the steam phase is sufficient to scavenge most or all of this oxygen. This creates "AVT-like" conditions downstream of the injection point of the oxygen scavenger, which suppresses oxide exfoliation-related pluggage in the high temperature portion of the steam circuit which is most susceptible to oxide exfoliation when operated with steam having an oxidizing chemistry.

Figure 2:
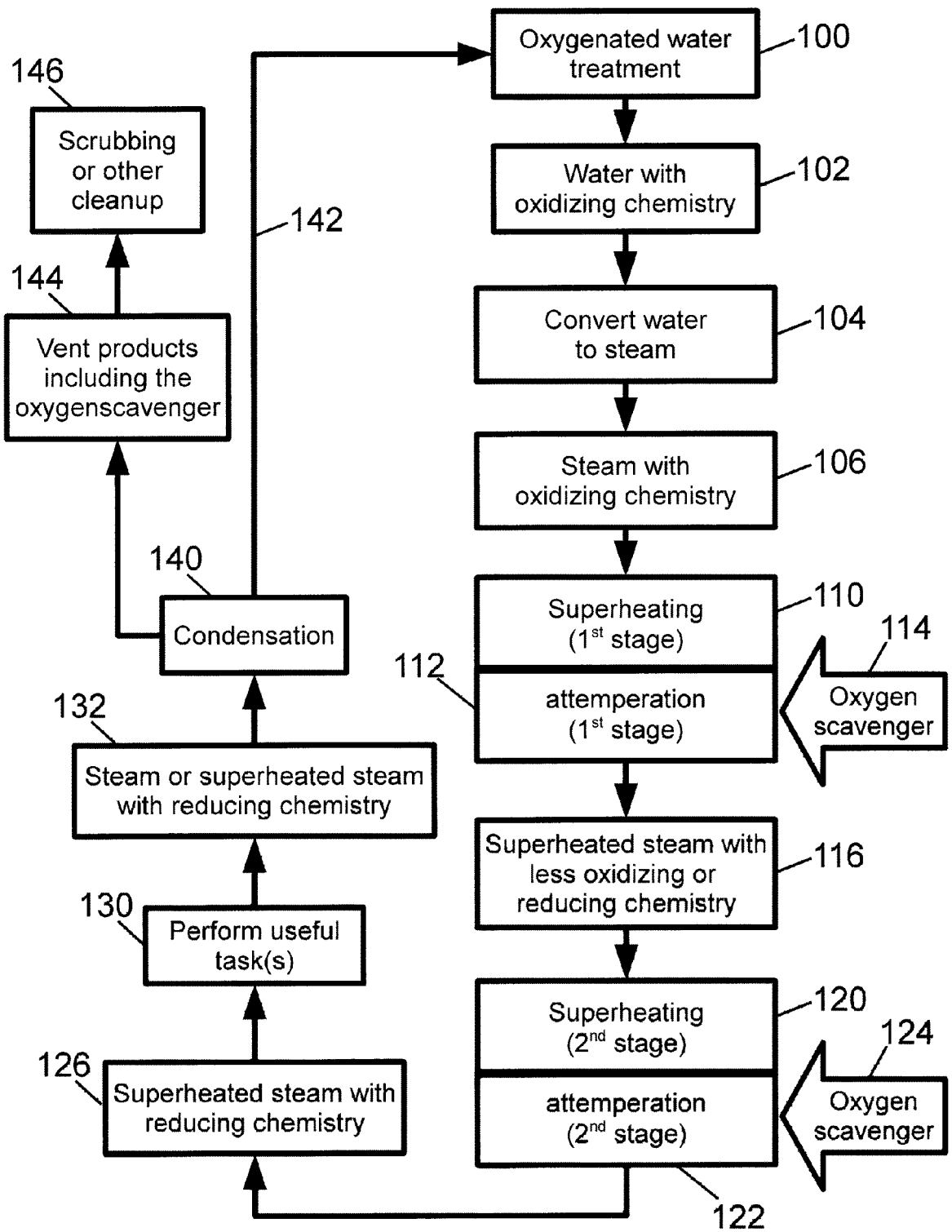
FIG. 2 diagrammatically shows a water treatment method for a steam generator water/steam circulation system as disclosed herein.

With reference to FIG. 2, an illustrative steam generation process including the disclosed water treatment process is set forth. The process of FIG. 2 can be usefully performed using substantially any type of steam generator that includes steel tubing. In an operation 100, the OWT process is performed to generate water having oxidizing chemistry 102. In an operation 104, this water is converted to steam having oxidizing chemistry 106.

In an operation 110, the steam is superheated, and in an operation 112 the superheated steam undergoes attemperation to reduce the temperature. In the attemperation operation 112, an oxygen scavenger 114 is also added, so as to form superheated steam at a desired controlled temperature and with less oxidizing or reducing chemistry 116.

Optionally, a second superheating stage is performed, including a second superheating operation 120 and a second attemperation operation 122 that optionally also employs an oxygen scavenger additive 124 (which may in general be the same additive or a different additive as compared with the oxygen scavenger 114), so as to produce final working steam having reducing chemistry 126. Optionally, a third or more superheating stages are performed (not illustrated). Alternatively or additionally, one or more reheating stages may be performed. The oxygen scavenger may be added at any attemperation operation. In some embodiments a useful tradeoff can be made in this way, such that intermediate stages of the steam circuit have varying degrees of steam chemistry so as to trade off corrosion resistance provided by oxidizing steam chemistry versus reduced exfoliation provided by less oxidizing or reducing steam chemistry.

The final working steam 126 is used in one or more useful operations 130, such as by way of example driving the turbine of an electric power plant. As such operations entail cooling of the steam, final steam 132 after the useful operations 130 may be steam or superheated steam 132. In either case, the final steam 132 is condensed in a condensation operation 140 to produce condensed water 142 that is optionally fed back into the OWT operation 100 (as illustrated). The condensation operation 140 also produces vent products 144 that include the oxygen scavenger. (This assumes that the oxygen scavenger volatility is such that it substantially remains in the gas phase after the steam condenses back into water). The vent products 144 undergo a scrubbing operation 146, as illustrated, or some other processing to contain or make safe the vent products 144.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A method comprising:
 performing steam generation including a water phase and a steam phase using a steam generator including steel tubing;
 applying an oxygenated water treatment in the water phase to convert the water to an oxidizing chemistry; and
 applying a reducing water treatment in the steam phase that converts the steam to a lower oxidation chemistry or to a reducing chemistry.

2. The method as set forth in claim 1, wherein the applying a reducing water treatment comprises:
 performing attemperation using water or steam including an oxygen scavenger additive.

3. The method as set forth in claim 2, wherein the performing of steam generation includes superheating the steam phase and the attemperation is performed on a superheated steam phase.

4. The method as set forth in claim 1, wherein the applying a reducing water treatment comprises adding an oxygen scavenger to the steam phase.

5. The method as set forth in claim 4, wherein the oxygen scavenger includes at least one of hydrazine and carbohydrazide.

6. The method as set forth in claim 1, wherein the reducing water treatment in the steam phase converts the steam to a reducing chemistry.

7. An apparatus comprising:
a steam generator including steam-side steel tubing arranged to carry generated steam; and
an attemperator or other injection device configured to inject into the steam-side steel tubing at least one of water and steam further including an oxygen scavenger additive.

8. A steam generation method comprising:
oxygenating water to generate water with oxidizing chemistry;
converting the water with oxidizing chemistry into steam with oxidizing chemistry; and
after the converting, adding an oxygen scavenger to the steam with oxidizing chemistry to create steam with less oxidizing or reducing chemistry.

9. The steam generation method as set forth in claim 8, further comprising:
condensing the steam with less oxidizing or reducing chemistry into water; and
repeating the oxygenating, converting, adding, and condensing to define a steam generation cycle.

10. The steam generation method as set forth in claim 8, wherein the adding comprises: adding a hydrazine-based oxygen scavenger.

11. The steam generation method as set forth in claim 10, wherein the hydrazine-based oxygen scavenger comprises hydrazine.

12. The steam generation method as set forth in claim 8, wherein the adding comprises: adding a hydrazide-based oxygen scavenger.

13. The steam generation method as set forth in claim 12, wherein the hydrazide-based oxygen scavenger comprises carbohydrazide.

14. The steam generation method as set forth in claim 8, wherein the adding comprises:
adding an oxygen scavenger comprising a combination of a hydrazine-based oxygen scavenger and a hydrazide-based oxygen scavenger.

15. The steam generation method as set forth in claim 8, wherein the adding comprises:
adding an oxygen scavenger comprising a combination of hydrazine and a carbohydrazide.

16. The steam generation method as set forth in claim 8, wherein the oxygenating comprises:
performing an oxygenated water treatment (OWT) on the water, the water having cation conductivity of less than 0.15 µS/cm at 25 C.

17. The steam generation method as set forth in claim 8, wherein the adding comprises:
performing attemperation using at least one of water and steam that includes the oxygen scavenger.

18. The steam generation method as set forth in claim 8, further comprising:
performing a superheating operation on at least one of the (i) steam with oxidizing chemistry and (ii) the steam with less oxidizing or reducing chemistry.

19. The steam generation method as set forth in claim 18, wherein the adding is performed after the superheating operation and the adding comprises:
performing attemperation using at least one of water and steam containing the oxygen scavenger.

20. The steam generation method as set forth in claim 19, further comprising:
after performing attemperation, performing at least one additional superheating operation.

21. The steam generation method as set forth in claim 19, further comprising repeating the superheating and attemperation operations at least once.

22. The steam generation method as set forth in claim 8, wherein the adding creates steam with reducing chemistry.

23. A steam generation system comprising:
an oxygenated water treatment (OWT) sub-system configured to generate water having oxidizing chemistry;
a steam generation sub-system configured to convert the water having oxidizing chemistry into steam having oxidizing chemistry;
an injector configured to add an oxygen scavenger to the steam having oxidizing chemistry to generate steam having less oxidizing or reducing chemistry; and
a condenser configured to condense the steam having less oxidizing or reducing chemistry into condensed water.

24. The steam generation system as set forth in claim 23, wherein the injector is configured to add the oxygen scavenger to the steam having oxidizing chemistry to generate steam having reducing chemistry.

25. The steam generation system as set forth in claim 23, wherein the injector comprises an attemperator.

26. The steam generation system as set forth in claim 23, wherein the condenser is further configured to input the condensed water to the OWT sub-system.

* * * * *